No. 871,650. PATENTED NOV. 19, 1907.
F. STREICH.
DOUGH DIVIDER.
APPLICATION FILED AUG. 31, 1906.
2 SHEETS—SHEET 2.
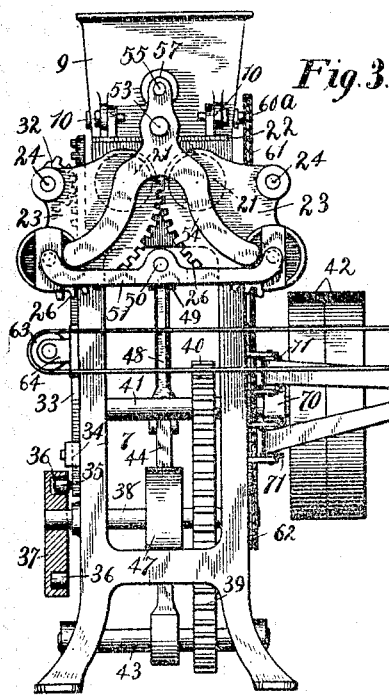
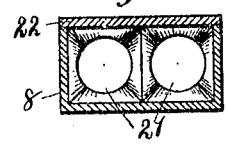
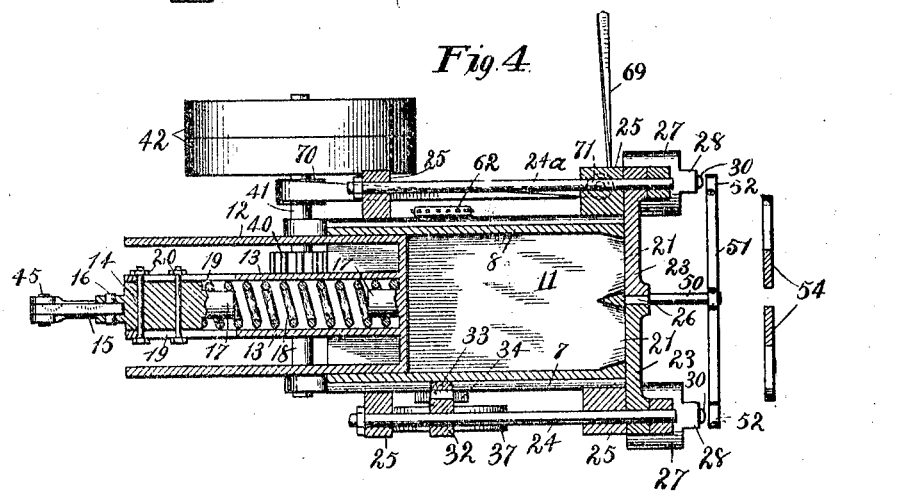
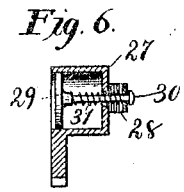
Witnesses:
Chas. F. Bassett
M. Wiarty
Inventor
Frank Streich
By Frederick Benjamin
Atty.

UNITED STATES PATENT OFFICE.

FRANK STREICH, OF JOLIET, ILLINOIS, ASSIGNOR TO CHAMPION MACHINERY COMPANY, OF JOLIET, ILLINOIS.

DOUGH-DIVIDER.

No. 871,650.　　　Specification of Letters Patent.　　　Patented Nov. 19, 1907.

Application filed August 31, 1906. Serial No. 332,861.

*To all whom it may concern:*

Be it known that I, FRANK STREICH, citizen of the United States, residing at Joliet, in the county of Will and State of Illinois, have invented certain new and useful Improvements in Dough-Dividers, of which the following is a specification.

My invention relates to improvements in machines for baker's use and refers more especially to that type of apparatus adapted for automatically measuring or dividing a mass of dough into equal portions in order to produce loaves of bread having a uniform weight.

Among the salient objects of my invention are, to produce a device for dividing dough with greater accuracy than has hitherto been possible either by hand work or mechanical appliances; to eliminate all handling of the material which would tend to produce an insanitary product; to provide an apparatus capable of dividing a greater amount of material in a given time; to simplify the parts so as to lessen the cost of manufacture, and to produce means for conveying the pieces of dough after division away from the machine.

The ordinary methods of dividing a mass of dough by cutting off pieces by hand and weighing or scaling them is not only a slow and tedious process, but is objectionable on account of the inaccurate results attained and also for sanitary reasons since the hands of the operator must necessarily come more or less into contact with the material thus manipulated. Some of these objections also hold regarding many of the mechanical appliances heretofore substituted. In my improved apparatus, however, I have practically eliminated all hand work and its accompanying disadvantages.

The construction and operation of the machine is such that duplicate portions of dough are simultaneously divided and placed upon the conveyer thus materially increasing the output, and, since all the operations are automatic after the material is placed in the hopper; and the division of the dough is accomplished under sufficient pressure to eliminate all air cavities of appreciable size, the separated portions are practically uniform in weight.

To accomplish these objects the invention consists in the mechanical construction hereinafter described, and more particularly pointed out in the appended claims; and further illustrated in the accompanying drawings forming a part of this specification, in which:—

Figure 1:
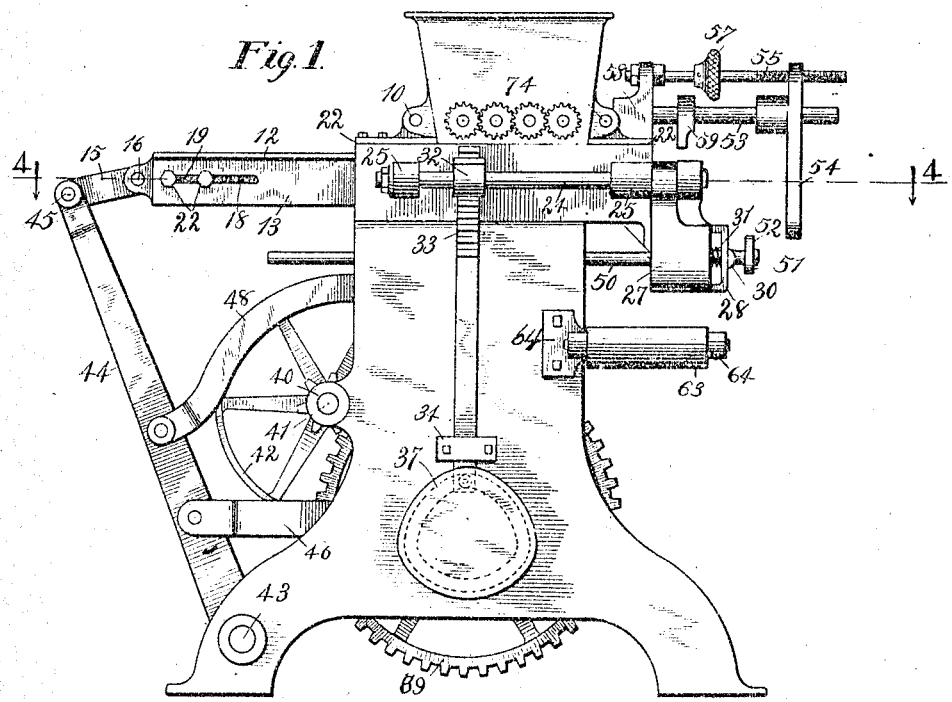
Figure 2:
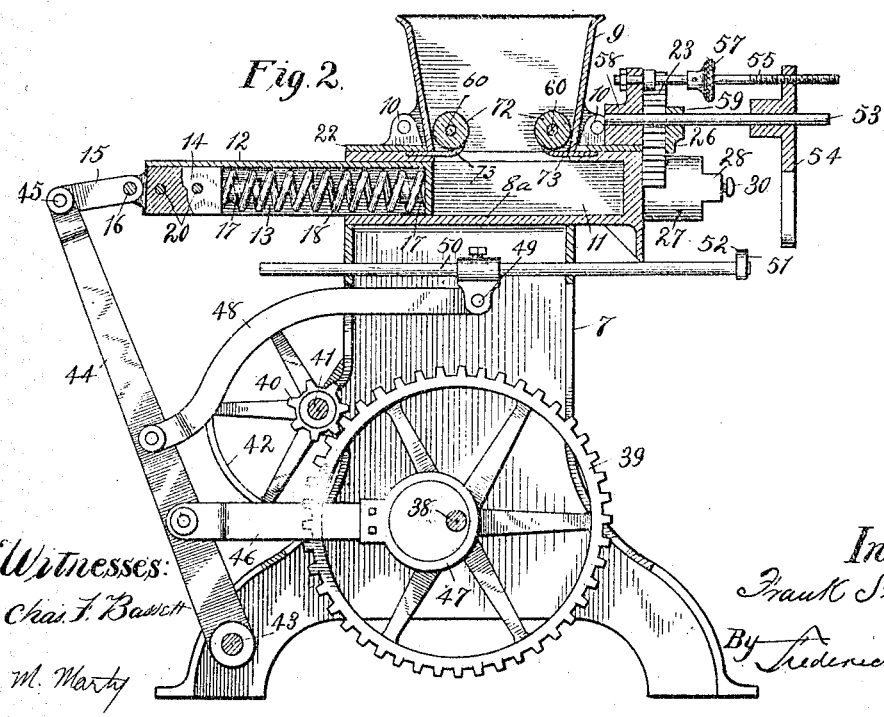

Figure 1 is a side elevation of my improved dough divider; Fig. 2 is a longitudinal vertical section; Fig. 3 is an end elevation of the complete machine with the conveyer attached; Fig. 4 is a sectional view on the line 4—4 of Fig. 1; Fig. 5 is a fragmentary view of the compression chamber seen in transverse section, and Fig. 6 is a longitudinal sectional view of one of the auxiliary receptacles.

Referring to the drawings, the numeral 7 indicates the frame of the machine, shown in one piece but which may, for convenience in construction be made in two or more parts secured by suitable bolts. The upper portion 8 of the frame is somewhat contracted laterally forming a receptacle or chamber, the bottom of which is closed by a plate $8^a$. A hopper 9 is placed above the said receptacle and removably secured in position by pins 10 which engage lugs formed integral with the hopper. The cavity or chamber of the receptacle is closed in front by a follower 12, adapted to be reciprocated therein. The top and inner end of said follower are preferably formed integrally with two parallel division plates 13 between which is slidably mounted a block 14 having a link 15 pivotally attached to its outer end by a pin 16. Lugs 17 projecting from the said block 14 and the rear wall of the follower carry a strong compression spring 18. The plates 13 are provided with longitudinal slots 19 adapted to receive bolts 20 which pass transversely through the said block 14. The rear wall of the chamber 11 is provided with circular openings 21. The said chamber is closed above by plates 22, leaving an opening for free communication between the hopper and the cavity 11 of the chamber. The said plates have lugs formed integral therewith to receive pins 10 which secure them to similar lugs, formed integral with the hopper 9. The circular openings 21 in the rear wall of the compression chamber 11 are closed by sectors 23, fixed to shafts 24, $24^a$, journaled in bearings 25 which project laterally from the main frame 7. Said sectors are furnished with segmental gears which mesh with each other. The sectors 23 carry auxiliary receptacles 27 cylindrical in form each cylinder being pro vided with a rearwardly projecting guide 28. Fitting the bore of each cylinder is a piston head 29 Fig. 6, rigidly secured to a rearwardly projecting rod 30 which passes through the rear wall of the cylinders and also through the guide 28 and terminates in a head or knob. The rod 30 is surrounded by a coiled spring 31 which tends to hold the piston 29 in a retracted position. Upon the shaft 24 is mounted a segmental gear 32 which engages a vertical rack 33 which vertically reciprocates in a guide plate 34. The lower end of the rack carries a roller 35 Fig. 3, which engages a groove 36 in a cam 37 keyed to a shaft 38 which carries a gear wheel 39 driven by a pinion 40 fixed to a driving shaft 41 upon which are mounted fast and loose pulleys 42. Pivoted at 43 is an operating lever 44 attached to the link 15 by a pin 45. An arm 46 is pivoted at one end to said lever and at the other attached to an eccentric 47 secured to the shaft 38. A curved arm 48 journaled to the said operating lever connects the latter with a clip 49 adjustably fixed to a reciprocating rod 50 which passes through bearings in the frame 7. The rear end of said rod is furnished with a cross head 51 the outer extremities 52 being upturned and are in alinement with the piston rod 30 when the cylinder 27 is at the lowest point of its movement as hereinafter described. A horizontal rod 53 projecting rearwardly carries a bifurcated stop arm 54 the hub of which has a sliding movement upon said rod 53. This sliding arm is moved along its shaft and held in position by an adjusting screw 55 which has secured thereto a hand wheel 57, the screw 55 and the rod 53 being rigidly held by a block 58 fixed to the rear cover plate 22. Keyed to the rod 53 is a guide 59 which engages the sector gears 26 when in their highest positions as described hereinafter, and prevents their displacement during the operative pressure of the plunger.

The hopper 9 is traversed by horizontal shafts 60 which project through the walls of the hopper. Upon one end of one shaft a sprocket wheel 60ª is connected by a chain 61 to a similar sprocket 62 mounted upon the end of the shaft 38. A roller 63 journaled in bearings 64 bolted to the main frame carries an endless apron 65 which passes around a roller 66, similar to 63 and mounted upon an auxiliary frame 67, which may be located at any desired distance from the machine. The roller 66 has a pulley 68 mounted upon its shaft and is driven by a belt 69 which receives motion from a pulley 70 carried by the main shaft 41, the direction of the belt being deviated by means of idlers 71 fixed to the side of the main frame 7. The shafts 60 have feed-rollers 72 mounted thereon and are provided with scrapers 73 which prevent clogging of the rollers and deflect the material into the compression chamber 11 in advance of the plunger 12. Motion is transmitted from the driven shaft of one feed roller to the other by a train of gears 74.

In operating the machine the material to be divided is placed in the hopper by any desirable method, and the machine is driven from any convenient source of power by a belt applied to the pulleys 42. Motion is transmitted through the gears 40, 39, to the eccentric 47 which will impart a rocking movement to the lever 44, thus transmitting a regular reciprocating motion to the follower 12. The cam 37 through the medium of the rack 33 will impart a regular rotary movement to the shaft 24, the operation of the segmental member 26 producing a like movement to its companion shaft 24ª. The cam groove 36 is so designed that during certain portions of its rotation the movement of the rack 33 will be stopped while the movements of the other portions of the mechanism will be uniformly continuous. The mutual arrangement of the parts is such that one of these delays will take place while the follower is moving toward the rear of the compression chamber, at which time the sectors are so placed that the cylinders 27 register with the openings 21 in the compression chamber, at the same time the feed rollers 60 will be rotating in such a direction as will tend to force the material in the hopper downward before the advancing plunger. Were this feeding mechanism or its equivalent not employed the tenacious character of the dough would interfere with the proper feeding for gravity alone cannot be depended upon to give the required result. The delay element in the cam 37 in the position indicated above exercises its function until the follower has reached the limit of its rearward movement during which the dough contained within the chamber 11 is forced into the auxiliary receptacles or cylinders 27, carrying their pistons 29 rearwardly until the rods 30 strike against the stop arms 54 thus preventing further recession of the pistons and determining the quantity of material which can be forced within the cylinder cavities. If this stop action takes place before the follower has reached the limit of its rearward movement the spring 18 will yield sufficiently to allow the lever 44 to complete its arc of movement without further action upon the follower. At the moment when the lever 44 starts forward again the cam 37 will act through the rack 33 to rotate the sectors carrying the cylinders downward their piston rods 30 gliding along the curved arms 54 until their lowest position is reached, when the delay element of the cam will again cause them to remain quiescent while the lever 44 continues its forward movement. The cross-head 51 following the movement of the lever 44 will now make contact with the projecting ends of the piston rods 30 and moving forward in unison with the lever movement will force out the contents of the cylinders to fall by gravity upon the conveyer 65. The lever 44 having now reached its forward limit the above described operation will be repeated. During the descent of the cylinders the openings 21 will be closed by the opposing surfaces of the sectors which are adapted to fit closely the end of the compression chamber.

It will be understood that during the descent of the cylinders that portion of material contained therein will be separated from the mass remaining in the chamber by the shearing action which takes place between the margins of the cylinders and those of the circular openings 21.

It will be clear that the quantity of dough may be minutely varied as may be demanded by changes in the character of the mixture used, by turning the screw 55 to set the guide arms 54 nearer to or farther from the cylinders.

It will be obvious that many changes may be made in the devices of my invention without departing from the spirit and scope thereof, and I do not wish, therefore, to be limited to the precise construction herein set forth.

Having thus described my invention what I claim as new and desire to secure by Letters Patent, is:—

1. In a machine for dividing plastic substances, a hopper, feed-rollers mounted in said hopper, a chamber communicating with said hopper, and a reciprocating plunger mounted in said chamber.

2. In a machine for dividing plastic substances, a hopper, feeding means arranged in said hopper, a chamber communicating with said hopper, and reciprocating means mounted in said chamber, said means consisting of a hollow plunger, a block slidably arranged in said plunger, and a spring arranged between said block and the end wall of the plunger.

3. In a machine for dividing plastic substances, a hopper, feeding means arranged in said hopper, a chamber communicating with said hopper, a hollow plunger slidably mounted in said chamber, a block slidably arranged in said plunger, means limiting the movements of said block, and cushioning means between said block and the end wall of said plunger.

4. In a machine for dividing plastic substances, a hopper, feeding means rotatably mounted in said hopper, a chamber communicating with said hopper, a hollow plunger slidably mounted in said chamber and having its walls slotted, a block slidably arranged in said plunger, and means engaging said block and slots and limiting the movements of said plunger.

5. An apparatus for the purpose specified including a receptacle for the material to be operated upon, a compression chamber, a follower adapted to reciprocate within said chamber, a plurality of movable auxiliary receptacles adapted to intermittently communicate with said compression chamber, means for varying the capacity of said auxiliary receptacles, means for simultaneously moving said auxiliary receptacles into and out of communication with said compression chamber, feeding mechanism, and a conveyer for the finished product.

6. An apparatus for the purpose specified including a receptacle adapted to receive the material to be acted upon, a compression chamber communicating with said receptacle, a follower adapted to be reciprocated within said compression chamber, yielding means for operating said follower, a plurality of movable auxiliary receptacles, means for bringing said auxiliary receptacles alternately into and out of communication with the said compression chamber, means for varying the capacity of said auxiliary receptacles, means for removing the material from the auxiliary receptacles, feeding mechanism, and a conveyer for the divided material.

7. An apparatus for the purpose specified including a hopper to receive the material a chamber communicating with said hopper, a follower adapted to reciprocate within said chamber, yielding means for operating said follower, auxiliary movable receptacles provided with yielding pistons, means for adjustably limiting the movement of said pistons, means for moving the said auxiliary receptacles into and out of communication with the said chamber, feed-rollers; means for moving said pistons, and a conveyer.

8. An apparatus for the purpose specified including a removable hopper, a chamber communicating with said hopper, feed-rollers, scrapers in contact with said feed rollers, a yielding plunger adapted to reciprocate within said chamber, operating means for the plunger, a plurality of auxiliary movable receptacles provided with pistons, springs for the pistons, means for variably limiting the movement of the pistons, means for intermittently operating said pistons, means for moving the said auxiliary receptacles intermittently into and out of communication with the said chamber, and a conveyer for the divided material.

9. In a dough dividing machine, comprising a compression chamber and means for compressing dough therein, dough measuring means, comprising two reciprocating plates having interengaging portions and each provided with a chamber having a piston mounted therein, and means for operating said plates.

10. In a dough dividing machine, a hopper, feed rollers mounted in said hopper, a compression chamber communicating with said hopper, a reciprocating plunger mounted in said chamber, means operating said plunger, dough measuring receptacles adapted to be brought into and out of registry with said chamber, means for operating said receptacles, and means for varying their capacity.

In testimony whereof I affix my signature in presence of two witnesses.

FRANK STREICH.

Witnesses:
FRANK J. WISE,
PHIL F. CARROLL.